United States Patent
Kajigaya et al.

(10) Patent No.: US 8,460,137 B2
(45) Date of Patent: Jun. 11, 2013

(54) BELT-DRIVE CVT

(75) Inventors: Akira Kajigaya, Atsugi (JP); Tomoo Kawagoshi, Machida (JP); Takahiro Imai, Tokyo (JP); Takuya Iwasawa, Sagamihara (JP); Daisuke Kawanishi, Isehara (JP)

(73) Assignee: Jatco Ltd, Fuji-shi (JP)

( * ) Notice: Subject to any disclaimer, the term of this patent is extended or adjusted under 35 U.S.C. 154(b) by 24 days.

(21) Appl. No.: 12/827,497

(22) Filed: Jun. 30, 2010

(65) Prior Publication Data
US 2011/0015012 A1 Jan. 20, 2011

(30) Foreign Application Priority Data
Jul. 15, 2009 (JP) .................... 2009-166445

(51) Int. Cl.
*F16H 59/00* (2006.01)
*F16H 61/00* (2006.01)

(52) U.S. Cl.
USPC .................... 474/11; 474/18; 474/70

(58) Field of Classification Search
USPC ........................ 474/11, 70, 18, 101
See application file for complete search history.

(56) References Cited

U.S. PATENT DOCUMENTS

| | | | | |
|---|---|---|---|---|
| 1,847,926 | A * | 3/1932 | Chase | 29/893.33 |
| 4,795,278 | A * | 1/1989 | Hayashi | 384/448 |
| 4,940,937 | A * | 7/1990 | Hattori | 324/207.22 |
| 5,114,572 | A | 5/1992 | Hunter et al. | |
| 5,310,384 | A | 5/1994 | Siemon | |
| 5,871,411 | A * | 2/1999 | Senger et al. | 474/11 |
| 5,888,384 | A | 3/1999 | Wiederhold et al. | |
| 6,089,999 | A * | 7/2000 | Imaida et al. | 474/18 |
| 6,315,693 | B1 * | 11/2001 | Tayama | 477/46 |
| 6,319,132 | B1 * | 11/2001 | Krisher | 464/143 |
| 6,392,405 | B1 * | 5/2002 | Nishizaki et al. | 324/173 |
| 6,498,475 | B2 * | 12/2002 | Foster et al. | 324/173 |
| 6,591,177 | B1 * | 7/2003 | Loffler | 701/63 |
| 6,642,709 | B2 * | 11/2003 | Heimann et al. | 324/173 |

(Continued)

FOREIGN PATENT DOCUMENTS

| | | |
|---|---|---|
| DE | 196 09 792 A1 | 9/1997 |
| DE | 196 09 793 A1 | 9/1997 |

(Continued)

OTHER PUBLICATIONS

U.S. Appl. No. 12/827,514, filed Jun. 30, 2010, Nonomura et al.

(Continued)

*Primary Examiner* — Michael Mansen
*Assistant Examiner* — Minh Truong
(74) *Attorney, Agent, or Firm* — Foley & Lardner LLP

(57) ABSTRACT

A belt-drive CVT includes a pair of pulleys, each of which has a stationary pulley and a movable pulley that moves toward or away from the stationary pulley in an axial direction of the pulley, a belt that is wound around the pair of pulleys and a rotation state detecting device for detecting rotation of the pulley. The rotation state detecting device has a tone wheel that rotates integrally with the pulley and a sensor that faces the tone wheel. The tone wheel has a cylinder portion that extends along a moving direction of the movable pulley. The cylinder portion is provided with a plurality of detection portions which are arranged at regular intervals in a circumferential direction throughout an entire circumference of the cylinder portion and which extend along the moving direction of the movable pulley.

18 Claims, 6 Drawing Sheets

U.S. PATENT DOCUMENTS

| | | | |
|---|---|---|---|
| 6,716,341 B2 | 4/2004 | Nguyen et al. | |
| 6,749,530 B2 | 6/2004 | Okano et al. | |
| 6,843,056 B1 | 1/2005 | Langenfeld et al. | |
| 7,350,631 B2 * | 4/2008 | Furuichi | 192/30 W |
| 7,566,287 B2 * | 7/2009 | Onishi et al. | 475/315 |
| 7,686,715 B2 * | 3/2010 | Carlson et al. | 474/28 |
| D651,950 S * | 1/2012 | Song | D12/180 |
| 2002/0142870 A1 | 10/2002 | Okano et al. | |
| 2002/0144938 A1 | 10/2002 | Hawkins et al. | |
| 2003/0183564 A1 | 10/2003 | Nguyen et al. | |
| 2003/0213336 A1 | 11/2003 | Hori et al. | |
| 2004/0025825 A1 | 2/2004 | Morita | |
| 2004/0061493 A1 * | 4/2004 | Fishburn et al. | 324/173 |
| 2004/0094383 A1 * | 5/2004 | Kinoshita et al. | 192/85 AA |
| 2004/0188181 A1 | 9/2004 | Hori et al. | |
| 2005/0090340 A1 * | 4/2005 | Wang et al. | 474/8 |
| 2009/0058403 A1 * | 3/2009 | Tomioka | 324/207.25 |

FOREIGN PATENT DOCUMENTS

| | | |
|---|---|---|
| JP | 2002-295613 A | 10/2002 |
| JP | 2003-106415 A | 4/2003 |
| JP | 2005-133805 A | 5/2005 |

OTHER PUBLICATIONS

A. Nonomura, U.S. PTO Office Action, U.S. Appl. No. 12/827,514, dated Jan. 3, 2013, 18 pages.

* cited by examiner

BELT-DRIVE CVT

BACKGROUND OF THE INVENTION

The present invention relates to a belt-drive CVT (continuously variable transmission) having a rotation state detecting device.

In a related art, to detect a rotation state (such as the number of revolutions and a rotation speed) of a pulley that has a belt pressed between a stationary pulley (a stationary sheave) and a movable pulley (a movable sheave), a belt-drive CVT in which an annular protruding portion having detection teeth for a rotation sensor is formed on a back surface of an outer circumferential portion of the stationary pulley has been known. For example, such a belt-drive CVT is disclosed in Japanese is Patent Provisional Publication No. 2002-295613 (hereinafter is referred to as "JP2002-295613").

SUMMARY OF THE INVENTION

In such a belt-drive CVT in JP2002-295613, however, since the detection teeth are formed at the stationary pulley, an installation position of the rotation sensor is limited to some extent, and this reduces layout flexibility.

For this problem, it is therefore an object of the present invention to provide a belt-drive CVT that is capable of increasing the layout flexibility.

According to one aspect of the present invention, a belt-drive CVT (continuously variable transmission) comprises: a pair of pulleys, each of which has (a) a stationary pulley and (b) a movable pulley that moves toward or away from the stationary pulley in an axial direction of the pulley; a belt that is wound around the pair of pulleys; and a rotation state detecting device for detecting rotation of the pulley which has (c) a tone wheel that rotates integrally with the pulley and (d) a sensor that faces the tone wheel. The tone wheel has a cylinder portion that extends along a moving direction of the movable pulley, and the cylinder portion is provided with a plurality of detection portions which are arranged at regular intervals in a circumferential direction throughout an entire circumference of the cylinder portion and which extend along the moving direction of the movable pulley.

The other objects and features of this invention will become understood from the following description with reference to the accompanying drawings.

DETAILED DESCRIPTION OF THE INVENTION

Figure 1:
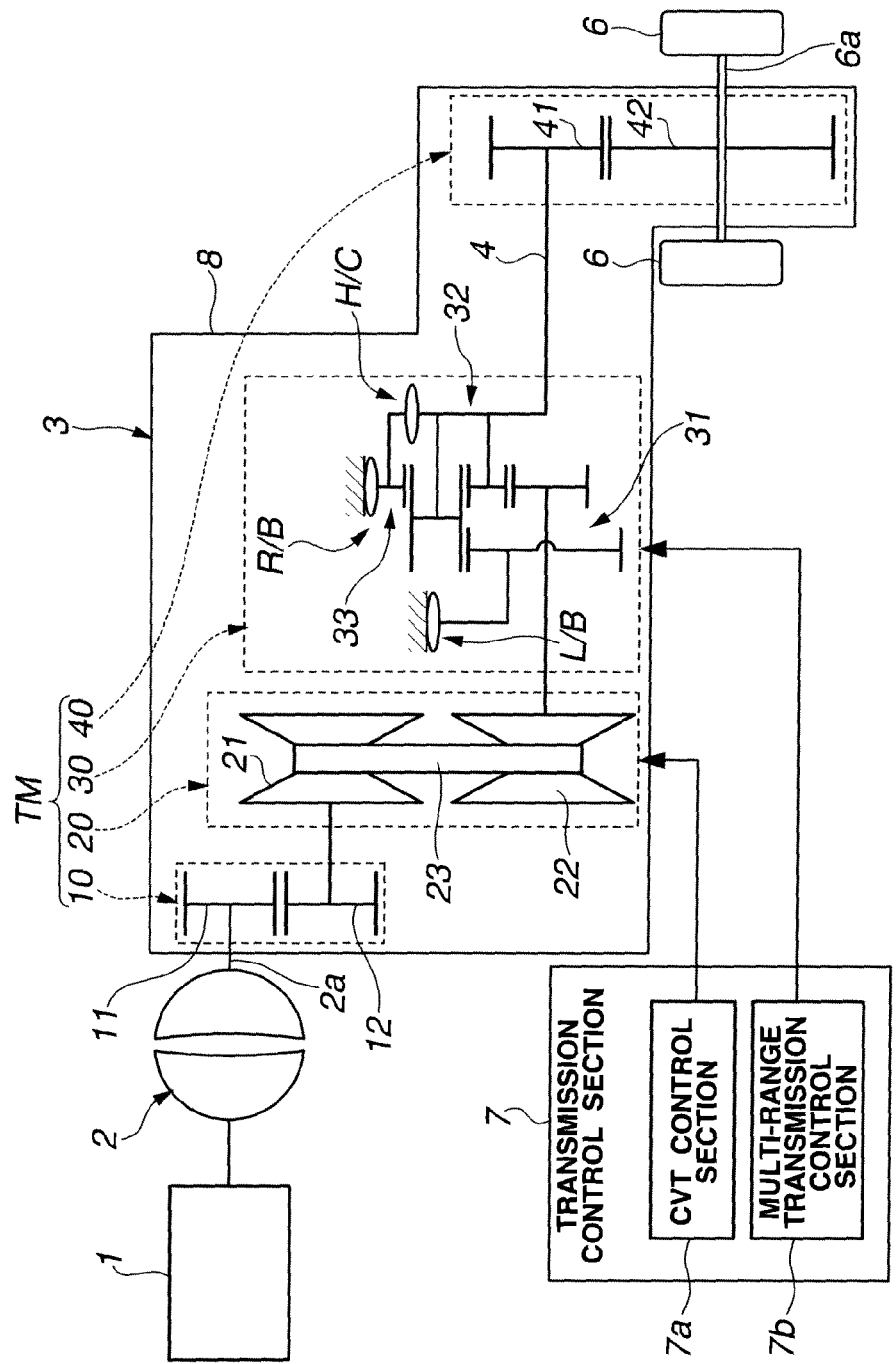
FIG. 1 is a schematic system diagram showing a power train in which a belt-drive CVT of an embodiment 1 is mounted.

According to a belt-drive CVT of the present invention, since a cylinder portion formed at a tone wheel is provided with a plurality of detection portions which are arranged at regular intervals in a circumferential direction throughout an entire circumference of the cylinder portion and which extend along a moving direction of a movable pulley, it is possible that the tone wheel is provided so as to be able to rotate integrally with the movable pulley and a sensor is set close to the movable pulley. As a consequence, it is possible to increase the layout flexibility when arranging a rotation state detecting device.

Embodiments of the present invention will now be explained below with reference to the drawings.

Embodiment 1

First, a system in the present invention will be explained. A power train shown in FIG. 1 has an engine 1 that is a drive source, a torque converter 2 that is connected with and driven by the engine 1, an automatic transmission (a belt-drive CVT (continuously variable transmission)) 3 that is connected with and driven by the torque converter 2, and wheels 6, 6 to which a power is transmitted and outputted from the automatic transmission 3 through a drive shaft 6a. The automatic transmission 3 is controlled by a transmission control section 7 having a continuously variable transmission control section (a CVT control section) 7a that controls an after-mentioned continuously variable transmission mechanism (CVT mechanism) 20 and a multi-range (or a geared) transmission control section 7b that controls an after-mentioned multi-range (or geared) transmission mechanism 30.

The automatic transmission 3 has a transmission mechanism TM that is housed in a transmission casing (a housing) 8.

Figure 2:
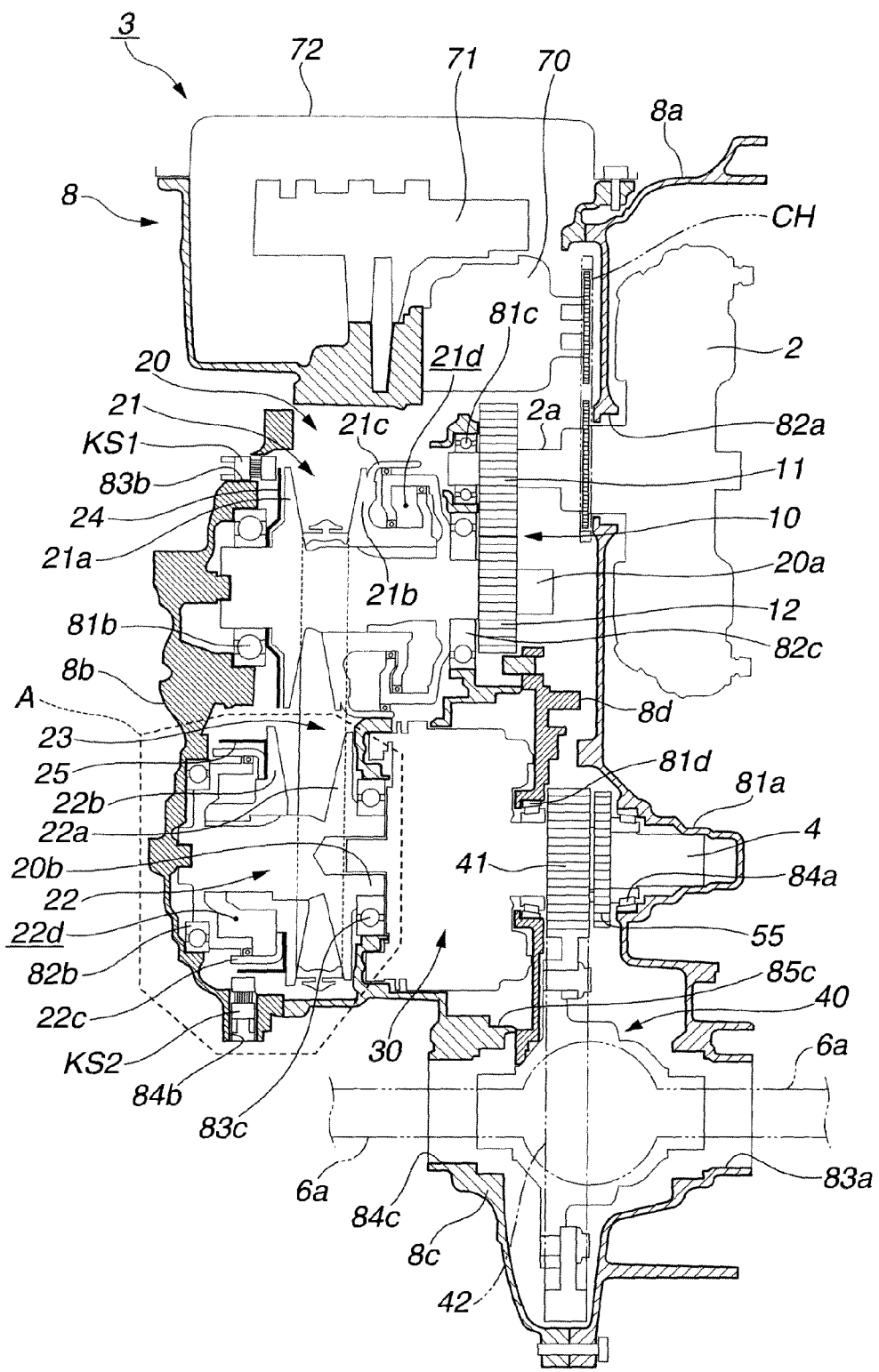
FIG. 2 is a sectional development showing the belt-drive CVT of the embodiment 1.

As shown in FIG. 2, the transmission casing 8 has a converter housing 8a, a transmission cover (a side cover) 8b, a transmission case 8c, and a bearing retainer 8d.

The converter housing 8a has a concave portion 81a in which the torque converter 2 is installed. The converter housing 8a forms an outer surface of the transmission casing 8 on a torque converter side. The converter housing 8a is provided with an input shaft penetration opening 82a into which an output shaft 2a of the torque converter 2 is inserted, and also provided with a drive shaft penetration opening 83a from which the drive shaft 6a protrudes. The input shaft penetration opening 82a is formed in the center of the concave portion 81a. In addition, an output bearing 84a for supporting a transmission output shaft 4 is provided at the converter housing 8a.

The transmission cover 8b covers axial direction end surfaces of a primary pulley 21 and a secondary pulley 22 of the CVT mechanism 20. The transmission cover 8b forms the outer surface of the transmission casing 8 on a CVT mechanism side. The transmission cover 8b is provided with a primary pulley bearing 81b for supporting the primary pulley 21, and also provided with a secondary pulley bearing 82b for supporting the secondary pulley 22.

Further, the transmission cover 8b is provided with a first sensor hole 83b where a primary pulley rotation speed sensor (a sensor) KS1 that detects the number of revolutions of the primary pulley 21 penetrates and is fixed, and also provided with a second sensor hole 84b where a secondary pulley rotation speed sensor (a sensor) KS2 that detects the number of revolutions of the secondary pulley 22 penetrates and is fixed.

As can be seen in FIG. 2, the first sensor hole 83b extends along an axial direction of the primary pulley 21, whereas the second sensor hole 84b extends along a direction orthogonal to an axial direction of the secondary pulley 22.

The transmission case 8c is supported between the converter housing 8a and the transmission cover 8b. The transmission case 8c forms a mid-wall that divides an inside of the transmission casing 8. In the present embodiment, the converter housing 8a and the transmission case 8c are combined with each other, and the transmission cover 8b and the transmission case 8c are combined with each other, then an outer surface or shell of the transmission casing 8 which is an enclosure or a body is formed.

The transmission case 8c is provided with an input shaft bearing 81c for supporting the output shaft 2a of the torque converter 2, and also provided with a primary pulley bearing 82c for supporting an input shaft of the primary pulley 21, further provided with a secondary pulley bearing 83c for supporting an output shaft of the secondary pulley 22. Moreover, the transmission case 8c is provided with a drive shaft penetration opening 84c from which the drive shaft 6a protrudes. In addition, the transmission case 8c has a concave portion 85c in which the multi-range transmission mechanism 30 is installed. The secondary pulley bearing 83c is positioned in the center of this concave portion 85c.

The bearing retainer 8d is so fixed as to cover the concave portion 85c of the transmission case 8c. The bearing retainer 8d is provided with an output shaft bearing 81d for supporting the transmission output shaft 4 that is connected with and driven by the multi-range transmission mechanism 30.

Next, the transmission mechanism TM will be explained. As shown in FIGS. 1 and 2, the transmission mechanism TM has a transmission gear mechanism 10, the CVT mechanism 20, the multi-range transmission mechanism 30, and a final drive gear mechanism 40.

The transmission gear mechanism 10 has a drive gear 11 that is secured to the output shaft 2a of the torque converter 2 and a driven gear 12 that is secured to the input shaft of the primary pulley 21 of the CVT mechanism 20. Here, a transmission ratio is arbitrarily set by a gear ratio between the drive gear 11 and the driven gear 12.

The CVT mechanism 20 is an existing belt-drive CVT having the primary pulley 21, the secondary pulley 22 and a belt 23 that is wound around these both pulleys 21 and 22. The driven gear 12 is secured to an input shaft 20a of the primary pulley 21, and the power from the transmission gear mechanism 10 is inputted to the primary pulley 21. An output shaft 20b of the secondary pulley 22 connects with the multi-range transmission mechanism 30 and drives the multi-range transmission mechanism 30. In this CVT mechanism 20, by varying each pulley width of the primary and secondary pulleys 21, 22, the transmission ratio can be continuously varied.

The primary pulley (pulley) 21 has a primary stationary conical disc (a stationary pulley or sheave) 21a which rotates integrally with the input shaft 20a and a primary movable conical disc (a movable pulley or sheave) 21b which is set opposite to the primary stationary conical disc 21a and can move toward or away from the primary stationary conical disc 21a in the axial direction. Between both primary stationary and movable conical discs 21a and 21b, a V-shaped pulley groove is formed.

The primary movable conical disc 21b moves in the axial direction by a fluid pressure that acts on a primary pulley fluid pressure chamber 21d which is defined by a primary fluid pressure cylinder (a fluid pressure cylinder) 21c. As seen in FIG. 2, on a back surface side of the primary stationary conical disc 21a, a disc-shaped primary side tone wheel 24 is fixed.

The primary side tone wheel 24 is secured to the primary stationary conical disc 21a, and rotates integrally with this primary stationary conical disc 21a. The primary side tone wheel 24 is provided with portions to be detected (called detection portions, not shown) which are arranged at regular intervals in a circumferential edge portion of the primary side tone wheel 24. The detection portions face a sensing part (not shown) of the primary pulley rotation speed sensor KS1. That is, the primary side tone wheel 24 and the primary pulley rotation speed sensor KS1 facing this primary side tone wheel 24 form a primary pulley rotation speed detecting unit that is a rotation state detecting device.

Figure 3:
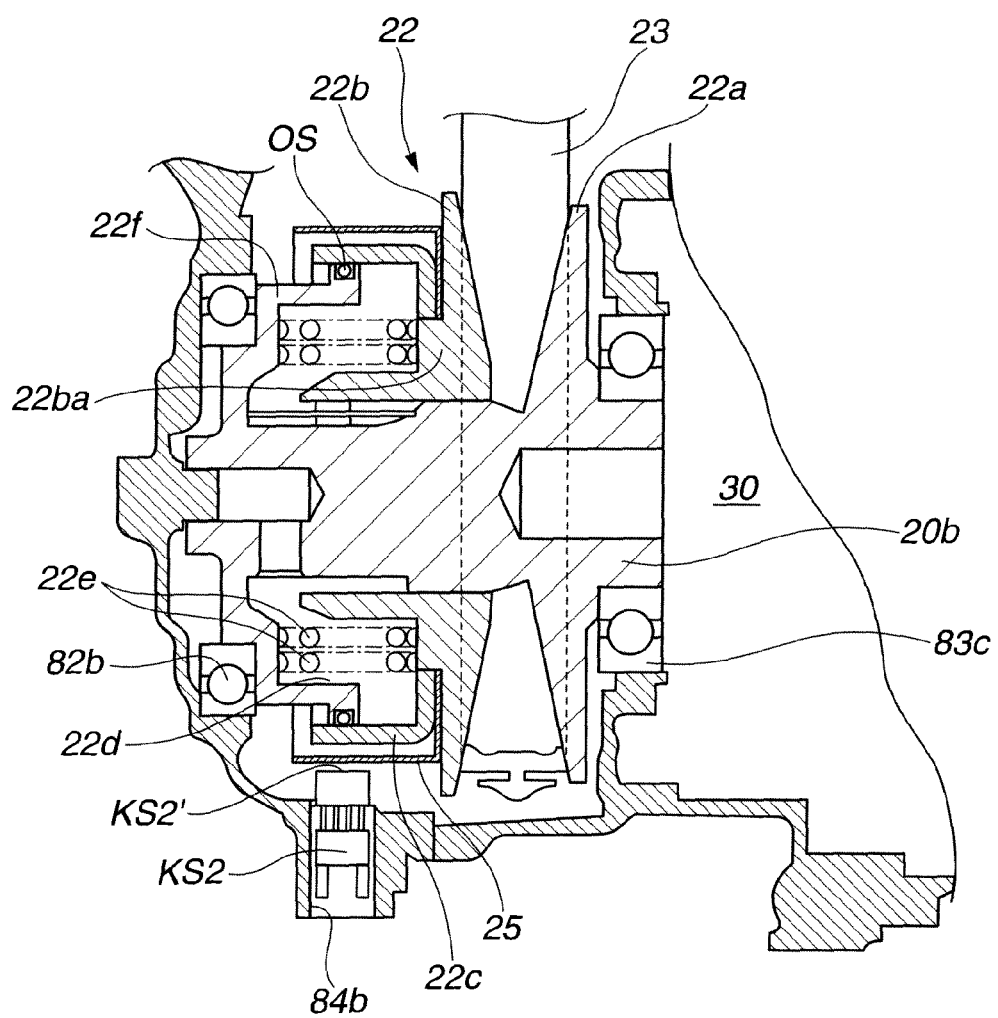
FIG. 3 is an enlarged view of "A" section in FIG. 2.

As shown in FIGS. 2 and 3, the secondary pulley (pulley) 22 has a secondary stationary conical disc (a stationary pulley or sheave) 22a which rotates integrally with the output shaft 20b and a secondary movable conical disc (a movable pulley or sheave) 22b which is set opposite to the secondary stationary conical disc 22a and can move toward or away from the secondary stationary conical disc 22a in the axial direction. Between both secondary stationary and movable conical discs 22a and 22b, a V-shaped pulley groove is formed.

The secondary movable conical disc 22b moves in the axial direction by a fluid pressure that acts on a secondary pulley fluid pressure chamber 22d which is defined by a secondary fluid pressure cylinder (a fluid pressure cylinder) 22c. Here, as seen in FIG. 3, a spring 22e is provided inside the secondary pulley fluid pressure chamber 22d, and the secondary movable conical disc 22b is forced toward the secondary stationary conical disc 22a. Further, a piston 22f that is integrally formed with the secondary stationary conical disc 22a slides in contact with an inner side surface of the secondary fluid pressure cylinder 22c through an oil seal OS.

In order to prevent an off-centered belt or slippage of the belt 23 running around the primary and secondary pulleys 21 and 22, the primary stationary conical disc 21a and the secondary stationary conical disc 22a, also the primary movable conical disc 21b and the secondary movable conical disc 22b, are diagonally arranged respectively.

On a back surface side of the secondary movable conical disc 22b, a secondary side tone wheel 25 is fixed.

Figure 4A:
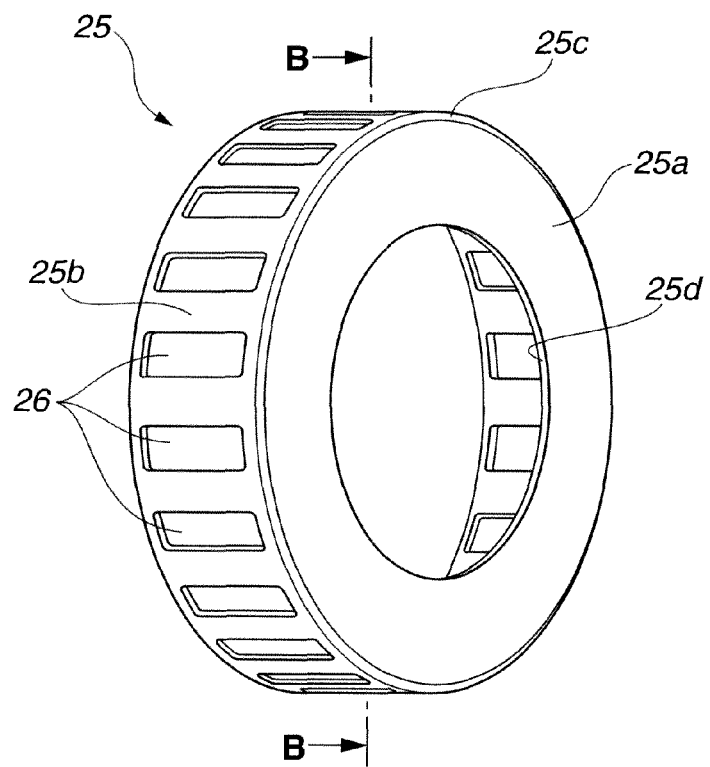
FIG. 4A is a perspective view of a tone wheel used in the belt-drive CVT of the embodiment 1.
Figure 4B:
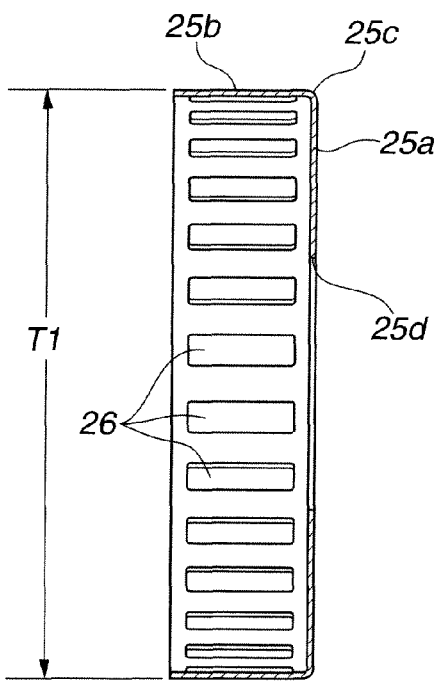
FIG. 4B is a sectional view of B-B in FIG. 4A.

As shown in FIG. 4, the secondary side tone wheel 25 has an attachment portion 25a that is sandwiched and supported between the secondary movable conical disc 22b and the secondary fluid pressure cylinder 22c and a cylinder portion 25b that encircles an outer circumferential surface of the secondary fluid pressure cylinder 22c with a circumferential clearance given between the secondary fluid pressure cylinder 22c and the cylinder portion 25b. The cylinder portion 25b continues from the attachment portion 25a through a bending portion 25c.

The attachment portion 25a has a disc shape which is in close contact with the back surface of the secondary movable conical disc 22b. The attachment portion 25a is provided, in its middle, with a fitting opening 25d into which a shaft part 22ba that extends from the back surface side of the secondary movable conical disc 22b is fitted.

The cylinder portion 25b has a cylindrical shape which extends along a moving direction of the secondary movable conical disc 22b, i.e. along the axial direction. An outside diameter T1 (see FIG. 4B) of the cylinder portion 25b is set to be smaller than that of the secondary movable conical disc 22b.

The cylinder portion 25b is provided with a plurality of long holes (portions to be detected, called detection portions) 26. The plurality of long holes 26 are arranged at regular intervals in a circumferential direction throughout an entire circumference of the cylinder portion 25b. Each of the long holes 26 extends along the moving direction (in the axial direction) of the secondary movable conical disc 22b, namely that the hole 26 is formed to be long in the moving direction (in the axial direction) of the secondary movable conical disc 22b. Each long hole 26 faces a sensing part KS2' of the secondary pulley rotation speed sensor KS2. A length in the moving direction (in the axial direction) of the long hole 26 is set to be longer than a movable range of the secondary movable conical disc 22b. In the present embodiment, the long hole 26 has a rectangular shape, viewed from above.

The secondary side tone wheel 25 and the secondary pulley rotation speed sensor KS2 facing this secondary side tone wheel 25 form a secondary pulley rotation speed detecting unit that is a rotation state detecting device.

The multi-range transmission mechanism 30 has a ravigneaux planetary gear mechanism. As can be seen in FIG. 1, a combined sun gear 31 of the ravigneaux planetary gear mechanism is connected to and driven by the secondary pulley 22 of the CVT mechanism 20, and the combined sun gear 31 acts as an input of the ravigneaux planetary gear mechanism. A carrier 32 connects with and drives the transmission output shaft 4, and the carrier 32 acts as an output of the ravigneaux planetary gear mechanism. The combined sun gear 31 is fixed to the transmission casing 8 through a low brake (a $1^{st}$ speed selection brake) L/B. The carrier 32 meshes with and is driven by a ring gear 33 through a high clutch (a $2^{nd}$ speed selection clutch) H/C. Further, the ring gear 33 is fixed to the transmission casing 8 through a reverse brake R/B.

In the multi-range transmission mechanism 30, the low brake L/B, the high clutch H/C and the reverse brake R/B are also supplied with oil (fluid), and their engagement/disengagement can be controlled according to the respective supplied fluid pressures. With this fluid pressure control, the forward $1^{st}$ speed, the forward $2^{nd}$ speed and a reverse $1^{st}$ speed of the multi-range transmission mechanism 30 can be selected.

When selecting the forward $1^{st}$ speed, only the low brake L/B is engaged. When selecting the forward $2^{nd}$ speed, only the high clutch H/C is engaged. Further, when selecting the reverse $1^{st}$ speed, the reverse brake R/B is engaged. A relationship of the engagement/disengagement of each brake and clutch L/B, H/C, R/B when controlling the multi-range transmission mechanism 30 is shown in a following Table 1. In the table, "◯" denotes "engagement", "×" denotes "disengagement (release)".

TABLE 1

|  | L/B | H/C | R/B |
| --- | --- | --- | --- |
| Forward 1st speed | ◯ | X | X |
| Forward 2nd speed | X | ◯ | X |
| Reverse 1st speed | X | X | ◯ |

When carrying out gear shift in the multi-range transmission mechanism 30, by performing a cooperative shift control between the CVT mechanism 20 and the multi-range transmission mechanism 30, a shift shock is suppressed.

The final drive gear mechanism 40 has a drive gear (a rotating member) 41 which is secured to the transmission output shaft 4 protruding from the bearing retainer 8d toward the converter housing 8a and a driven gear (a rotating member) 42 which is secured to the drive shaft 6a penetrating the converter housing 8a and the transmission case 8c and connects with the wheels 6, 6 through the drive shaft 6a. Here, a speed reduction ratio is arbitrarily set by a gear ratio between the drive gear 41 and the driven gear 42.

In FIG. 2, reference sign 55 is a parking gear, reference sign 70 is an oil pump, reference sign 71 is a valve control unit, reference sign 72 is an oil pan. The oil pump 70 is connected to the output shaft 2a of the torque converter 2 through a chain CH, and is driven by rotation of the output shaft 2a.

Next, operation or working will be explained. First, [Objective of detecting the secondary pulley rotation speed] and [Reason for detecting the rotation speed of the secondary movable conical disc] will be explained. Subsequently, operation or working of the belt-drive CVT of the embodiment 1 will be explained in [Achievement of increase in the layout flexibility] and [Achievement of improvement in rotation speed detection accuracy].

[Objective of Detecting the Secondary Pulley Rotation Speed]

In general, to calculate a transmission ratio in the belt-drive CVT having the CVT mechanism, rotation speed (the number of revolutions) of the primary stationary conical disc of the primary pulley and rotation speed (the number of revolutions) of the parking gear secured to the output shaft are detected or sensed, as a common method.

In contrast to this, in the formation in the automatic transmission 3 in the embodiment 1, the multi-range transmission mechanism 30 is arranged or placed on a downstream side (wheel 6 side) of the CVT mechanism 20. That is, the multi-range transmission mechanism 30 intervenes between the output shaft 20b of the CVT mechanism 20 and the parking gear 55. Therefore, in a case where the rotation speed of the parking gear 55 is sensed, it is not possible to accurately calculate the transmission ratio in the CVT mechanism 20.

Hence, in order to accurately calculate the transmission ratio of the CVT mechanism 20, it is required to sense the rotation speed of the secondary pulley 22.

[Reason for Detecting the Rotation Speed of the Secondary Movable Conical Disc]

Regarding detection of the pulley rotation speed, normally, irrespective of the primary pulley 21 or the secondary pulley 22, the rotation speed of the stationary pulley (the stationary conical disc) is sensed.

In contrast to this, in the automatic transmission 3 in the embodiment 1, since the multi-range transmission mechanism 30 is placed extremely close to the secondary stationary conical disc 22a, it is difficult to secure space for arranging or installing the secondary pulley rotation speed sensor KS2 close to the secondary stationary conical disc 22a. Conversely, even if the space is created, it is difficult to achieve reduction in size of the transmission casing 8.

In addition, as explained above, in the primary and secondary pulleys 21 and 22, the primary stationary conical disc 21a and the secondary stationary conical disc 22a, also the primary movable conical disc 21b and the secondary movable conical disc 22b, are diagonally arranged respectively. Because of this, for instance, in a case where the rotation speed of the primary stationary conical disc 21a and the rotation speed of the secondary stationary conical disc 22a are each sensed, positions of the primary pulley rotation speed sensor KS1 and the secondary pulley rotation speed sensor KS2 are separated from each other. This does not facilitate installation of the sensors, and performance of assembly might deteriorate.

Hence, because of this layout, it is required to detect the rotation speed of the secondary movable conical disc 22b.

[Achievement of Increase in the Layout Flexibility]

In the automatic transmission 3 in the embodiment 1, to calculate the transmission ratio of the CVT mechanism 20, the rotation speed of the primary pulley 21 is detected first. With respect to this detection, line of magnetic force emitted from the primary pulley rotation speed sensor KS1 is fluctuated by the detection portions (not shown) of the primary side tone wheel 24 which rotates integrally with the primary stationary conical disc 21a. This fluctuation or perturbation is detected and converted into electronic signals, then the rotation speed is obtained.

Second, the rotation of the secondary pulley 22 is detected. With respect to this detection, line of magnetic force emitted from the secondary pulley rotation speed sensor KS2 is fluctuated by the long holes 26 provided at the cylinder portion 25b of the secondary side tone wheel 25 which rotates integrally with the secondary movable conical disc 22b. This fluctuation or perturbation is detected and converted into electronic signals, then the rotation speed is obtained.

Here, the secondary movable conical disc 22b moves in the axial direction by the fluid pressure that acts on the secondary pulley fluid pressure chamber 22d. On the other hand, as mentioned above, the long holes 26 formed at the cylinder portion 25b of the secondary side tone wheel 25 extend along the moving direction of the secondary movable conical disc 22b.

Thus, regardless of the movement of the secondary movable conical disc 22b, a part of the long hole 26 is able to face the sensing part KS2' of the secondary pulley rotation speed sensor KS2 all the time. This allows the secondary pulley rotation speed detecting unit (or device) that is the rotation state detecting device to be set on the secondary movable conical disc 22b side, and the rotation speed of the secondary movable conical disc 22b can be detected. As a consequence, it is possible to increase the layout flexibility of the rotation state detecting device.

Furthermore, in the automatic transmission 3 in the embodiment 1, the cylinder portion 25b encircles the outer circumferential surface of the secondary fluid pressure cylinder 22c with the circumferential clearance given between the secondary fluid pressure cylinder 22c and the cylinder portion 25b. Also, structurally, the secondary movable conical disc 22b and the attachment portion 25a are fixedly connected to each other, and these secondary movable conical disc 22b and attachment portion 25a move together. With this structure, the secondary pulley fluid pressure chamber 22d defined by the secondary fluid pressure cylinder 22c and the cylinder portion 25b can be set in the same axial direction (i.e. the secondary fluid pressure cylinder 22c and the cylinder portion 25b are concentrically overlap with each other), and an installation space of the cylinder portion 25b can be reduced. With this reduction in space of secondary side tone wheel 25, the layout flexibility can be further increased.

In particular, in the automatic transmission 3 in the embodiment 1, since the circumferential clearance between the secondary fluid pressure cylinder 22c and the cylinder portion 25b is suitably provided, there is no need to work the outer circumferential surface of the secondary fluid pressure cylinder 22c. This can reduce the cost of manufacturing.

Moreover, in the automatic transmission 3 in the embodiment 1, the outside diameter T1 of the cylinder portion 25b is set to be smaller than that of the secondary movable conical disc 22b. This can further reduce the installation space of the secondary side tone wheel 25, and the layout flexibility can be increased.

[Achievement of Improvement in Rotation Speed Detection Accuracy]

In the automatic transmission 3 in the embodiment 1, the attachment portion 25a of the secondary side tone wheel 25 is sandwiched and supported between the secondary movable conical disc 22b and the secondary fluid pressure cylinder 22c. Also the cylinder portion 25b continues from the attachment portion 25a through the bending portion 25c.

Here, the secondary fluid pressure cylinder 22c is pressed against the back surface of the secondary movable conical disc 22b all the time by the fluid pressure that acts on the secondary pulley fluid pressure chamber 22d. Consequently, the fluid pressure is also exerted on the attachment portion 25a sandwiched and supported between the secondary movable conical disc 22b and the secondary fluid pressure cylinder 22c, and the secondary side tone wheel 25 can be fixed with stability.

With this, slip or spin of the secondary side tone wheel 25 against the secondary movable conical disc 22b is suppressed, and adhesion of the secondary side tone wheel 25 to the secondary movable conical disc 22b is increased. The secondary side tone wheel 25 and the secondary movable conical disc 22b can therefore rotate together without spin, and the rotation speed detection accuracy can be improved.

Figure 5A:
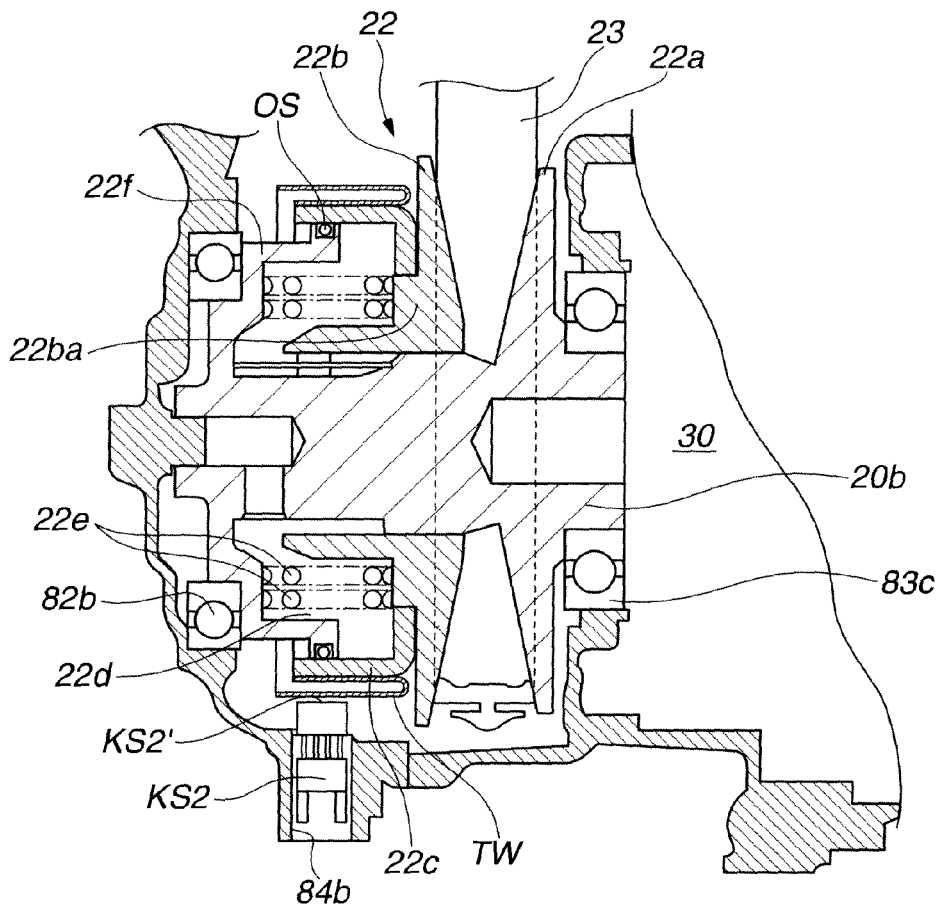
FIG. 5A is a sectional view showing a main part of a belt-drive CVT of a comparative example.
Figure 5B:
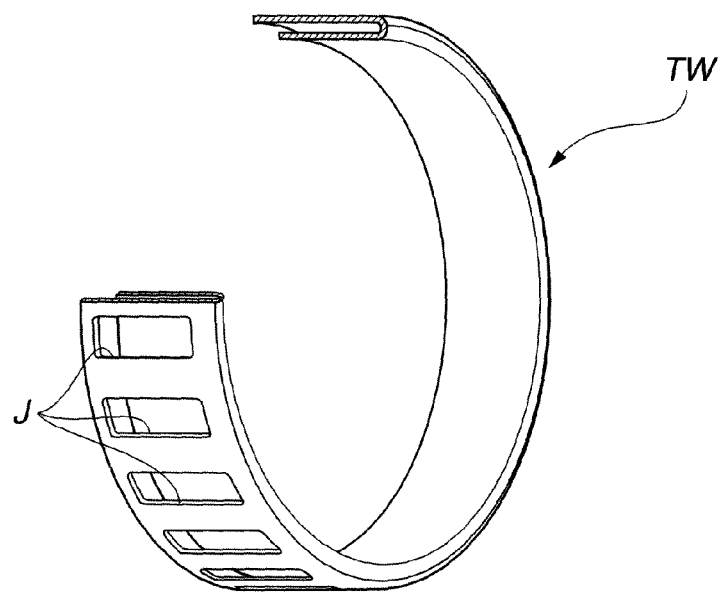
FIG. 5B is a perspective view of a tone wheel of the comparative example, and the tone wheel is shown with a part of the tone wheel cut.

Here, in FIG. 5A, a sectional view of a main part of a belt-drive CVT of a comparative example is shown. In FIG. 5B, a perspective view of a tone wheel of the comparative example is shown, and the tone wheel is shown with a part of the tone wheel cut.

In this comparative example, as seen in the drawings, a tone wheel TW has a ring shape whose cross section is a shape of a letter "U". By forming the cross section into U-shape, the tone wheel TW has elastic force. And by fitting the tone wheel TW into an outer circumferential surface of the secondary fluid pressure cylinder 22c that defines the secondary pulley fluid pressure chamber 22d, structurally, the tone wheel TW and the secondary movable conical disc 22b are fixedly connected to each other. On an outer circumferential surface of the tone wheel TW, a plurality of long holes (detection portions) J, which extend along the moving direction of the secondary movable conical disc 22b and are arranged at regular intervals in a circumferential direction, are provided.

However, in this case, because the tone wheel TW is fitted into the secondary fluid pressure cylinder 22c by its own elastic force, when the elastic force decreases with time, slip of the tone wheel TW against the secondary fluid pressure cylinder 22c could occur. Then there is a possibility that the tone wheel TW cannot rotate with the secondary movable conical disc 22b, and this causes decrease in the rotation speed detection accuracy.

Further, the tone wheel TW of the comparative example has a sophisticated shape or structure, and high dimension accuracy is required to fit the tone wheel TW into the secondary fluid pressure cylinder 22c. Thus the cost of manufacturing might increase.

In contrast to this, in the automatic transmission 3 in the embodiment 1, since the secondary side tone wheel 25 is secured by sandwiching and supporting the attachment portion 25a between the secondary movable conical disc 22b and the secondary fluid pressure cylinder 22c, it is possible to simplify a whole shape of the secondary side tone wheel 25, also the high dimension accuracy is not required. Thus increase in cost of manufacturing can be suppressed.

Furthermore, in the automatic transmission 3 in the embodiment 1, the secondary pulley rotation speed sensor KS2 is provided at the transmission cover 8b that forms the outer surface of the transmission casing 8. Because of this, after carrying out subassembly in which the secondary pulley rotation speed sensor KS2 is previously installed in the transmission cover 8b, assembly of the automatic transmission 3 can be carried out. Performance of assembly can be therefore improved.

Moreover, in the CVT mechanism 20 in the embodiment 1, since the primary stationary conical disc 21a and the secondary stationary conical disc 22a, also the primary movable conical disc 21b and the secondary movable conical disc 22b, are diagonally arranged respectively, the primary stationary conical disc 21a and the secondary movable conical disc 22b are covered with the transmission cover 8b. Thus the primary pulley rotation speed sensor KS1 can also be set at the transmission cover 8b that forms the outer surface of the transmission casing 8.

As a consequence, both the primary pulley rotation speed sensor KS1 and the secondary pulley rotation speed sensor KS2 can be previously installed in the transmission cover 8b, and performance of assembly can be further improved.

Next, effects of the present invention will be explained. In the belt-drive CVT of the embodiment 1, the following effects can be obtained.

(1) The belt-drive CVT (continuously variable transmission) 3 has: a pair of pulleys (the primary pulley 21, the secondary pulley 22), each of which has (a) the stationary pulley (the primary stationary conical disc 21a, the secondary stationary conical disc 22a) and (b) the movable pulley (the primary movable conical disc 21b, the secondary movable conical disc 22b) that moves toward or away from the stationary pulley 21a, 22a in the axial direction of the pulley 21, 22; the belt 23 that is wound around the pair of pulleys 21, 22; and the rotation state detecting device having (c) the tone wheel (the secondary side tone wheel 25) that rotates integrally with the pulley 22 and (d) the sensor (the secondary pulley rotation speed sensor KS2) that faces the tone wheel 25. And the tone wheel 25 has the cylinder portion 25b that extends along the moving direction of the movable pulley 22b, and the cylinder portion 25b is provided with a plurality of detection portions (the long holes 26) which are arranged at regular intervals in the circumferential direction throughout the entire circumference of the cylinder portion 25b and which extend along the moving direction of the movable pulley 22b.

With this, the rotation state detecting device can be set at the movable pulley 22b side, and it is possible to increase the layout flexibility when arranging the rotation state detecting device.

(2) The cylinder portion 25b is set so as to encircle the outer circumferential surface of the fluid pressure cylinder (the secondary fluid pressure cylinder 22c) of the movable pulley 22b with the circumferential clearance given between the secondary fluid pressure cylinder 22c and the cylinder portion 25b, and structurally, the cylinder portion 25b and the movable pulley 22b are fixedly connected to each other, and move together. With this, the fluid pressure chamber (the secondary pulley fluid pressure chamber) 22d and the cylinder portion 25b can be set in the same axial direction (i.e. the secondary fluid pressure cylinder 22c and the cylinder portion 25b are concentrically overlap with each other), and the installation space of the cylinder portion 25b can be reduced. Thus the layout flexibility can be further increased.

(3) The tone wheel 25 has the attachment portion 25a that is sandwiched and supported between the movable pulley 22b and the fluid pressure cylinder 22c, and the cylinder portion 25b continues from the attachment portion 25a through the bending portion 25c.

With this, the tone wheel 25 can be fixed with stability, and slip or spin of the tone wheel 25 against the secondary pulley 22 is prevented, then the improvement in rotation speed detection accuracy can be achieved.

(4) The sensor KS2 is set at the side cover (the transmission cover 8b) which covers the axial direction end surface of the pulley 22 and forms the outer surface of the housing (the transmission casing 8).

With this, the sensor KS2 can be previously installed in the side cover 8b in the subassembly, and performance of assembly can be therefore improved.

(5) The outside diameter T1 of the cylinder portion 25b is set to be smaller than the outside diameter of the movable pulley 22b.

With this, reduction in the installation space of the secondary side tone wheel 25 can be further achieved, and the layout flexibility can be increased.

Although the present invention has been described above, it is not limited to the above embodiment.

For example, in the embodiment 1, the secondary side tone wheel 25 is formed independently of the secondary movable conical disc 22b, as a different component. However, it could be possible that a cylinder portion that extends in the moving direction (in the axial direction) is formed integrally with the back surface of the secondary movable conical disc 22b, and a plurality of long holes, each of which extends along the moving direction, are provided at this cylinder portion integrally formed.

Also in this case, regardless of the movement of the secondary movable conical disc 22b, since a part of the long hole is able to face the secondary pulley rotation speed sensor KS2 all the time, the rotation of the secondary movable conical disc 22b can be detected.

Figure 6A:
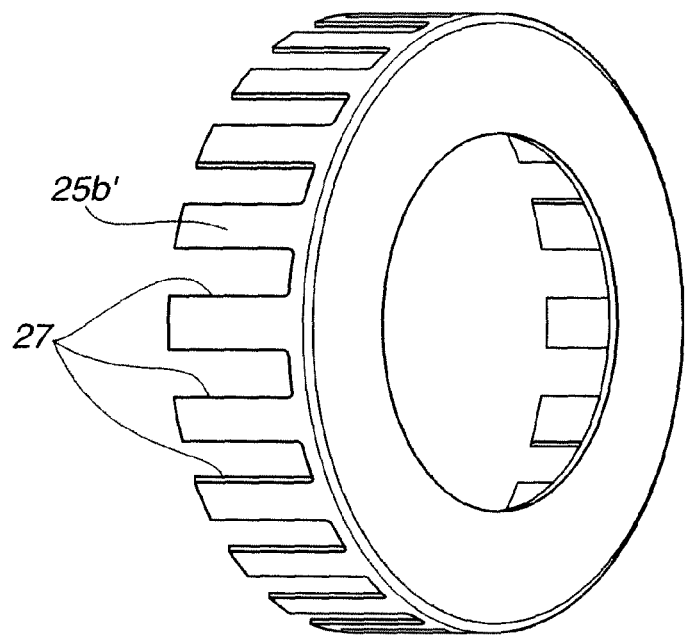
FIG. 6A is a perspective view of a tone wheel of a first modification.
Figure 6B:
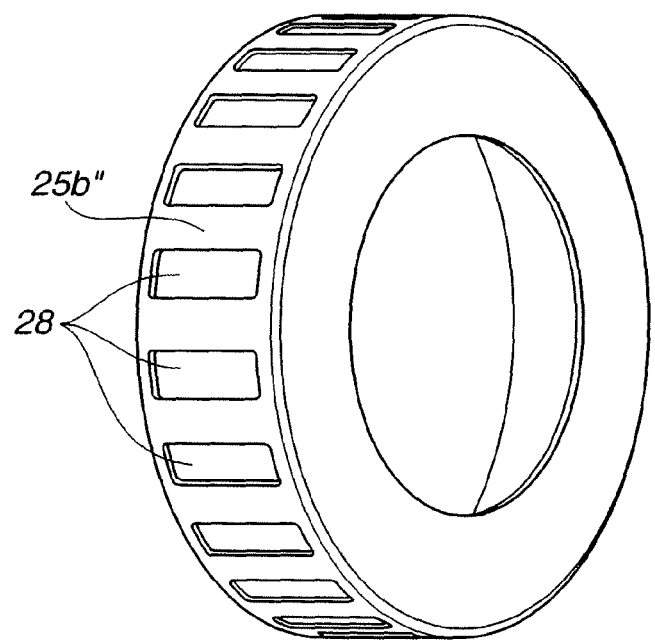
FIG. 6B is a perspective view of a tone wheel of a second modification.

Further, in the embodiment 1, as the detection portion which is provided at the cylinder portion 25b, the long hole 26 having rectangular shape is provided. However, as shown in FIG. 6A, a detection portion 27 having an open-end on one side of a cylinder portion 25b', which is a cut-off shape, could be employed. Or, as shown in FIG. 6B, a concave or recessed detection portion 28 which is not a hole but a concave or recess whose thickness is thinner than a normal surface of a cylinder portion 25b" could be employed. Further, instead of the concave detection portion 28, a convex detection portion whose thickness is thicker than a normal surface of a cylinder portion might be employed.

Furthermore, in the embodiment 1, the rotation speed of the secondary movable conical disc 22b of the secondary pulley 22 is detected. However, the rotation speed of the primary movable conical disc 21b of the primary pulley 21 could be detected, depending on the layout.

In addition, in the embodiment 1, the rotation speed of the secondary pulley 22 is detected by the secondary pulley rotation speed sensor KS2. However, the number of revolutions (i.e. rotation speed) or rotation angular velocity could be detected. Even in this case, by providing the tone wheel having the detection portion that extends in the moving direction of the movable pulley, these detection values can be detected regardless of a position of the movable pulley.

The entire contents of Japanese Patent Application No. 2009-166445 filed on Jul. 15, 2009 are incorporated herein by reference.

Although the invention has been described above by reference to certain embodiments of the invention, the invention is not limited to the embodiments described above. Modifications and variations of the embodiments described above will occur to those skilled in the art in light of the above teachings. The scope of the invention is defined with reference to the following claims.

What is claimed is:

1. A belt-drive continuously variable transmission comprising:
   a pair of pulleys, each of the pair of pulleys having:
   (a) a stationary pulley; and
   (b) a movable pulley that moves toward or away from the stationary pulley in an axial direction of the pulley;

a belt wound around the pair of pulleys; and
a rotation state detecting device for detecting rotation of one of the pair of pulleys, the rotation state detecting device having:
  (c) a tone wheel that rotates integrally with the one of the pair of pulleys; and
  (d) a sensor that faces the tone wheel, the tone wheel having a cylinder portion that extends along a moving direction of the movable pulley and the cylinder portion having a plurality of detection portions at regular intervals along a circumferential direction throughout an entire circumference of the cylinder portion and extending along the moving direction,
wherein the cylinder portion is on an outer circumference side of a fluid pressure cylinder of the movable pulley,
wherein the cylinder portion and the movable pulley are fixedly connected to each other,
wherein the tone wheel has an attachment portion sandwiched and supported between the movable pulley and the fluid pressure cylinder, and
wherein the cylinder portion continues from the attachment portion through a bending portion such that a position of the cylinder portion is fixed relative to a position of the attachment portion.

2. The belt-drive continuously variable transmission as claimed in claim 1, wherein one of the detection portions is formed by any one of a hole, an open-end detection portion whose one end is cut off, a concave detection portion, and a convex detection portion.

3. The belt-drive continuously variable transmission as claimed in claim 1, wherein the sensor is at a side cover that covers an axial direction end surface of the one of the pair of pulleys.

4. The belt-drive continuously variable transmission as claimed in claim 1, wherein an outside diameter of the cylinder portion is smaller than an outside diameter of the movable pulley.

5. The belt-drive continuously variable transmission as claimed in claim 1, wherein the tone wheel is on a movable pulley side.

6. The belt-drive continuously variable transmission as claimed in claim 1, wherein a length, in the moving direction of the movable pulley, of one of the detection portions is longer than a movable range of the movable pulley.

7. A belt-drive continuously variable transmission comprising:
a pair of pulleys, each of the pair of pulleys having:
  (a) a stationary pulley; and
  (b) a movable pulley that moves toward or away from the stationary pulley in an axial direction of the pulley;
a belt wound around the pair of pulleys; and
a rotation state detecting device for detecting rotation of one of the pair of pulleys, the rotation state detecting device having:
  (c) a tone wheel that rotates integrally with the one of the pair of pulleys; and
  (d) a sensor that faces the tone wheel, the tone wheel having a cylinder portion that extends along a moving direction of the movable pulley and the cylinder portion having a plurality of detection portions at regular intervals along a circumferential direction throughout an entire circumference of the cylinder portion and extending along the moving direction,
wherein the cylinder portion is on an outer circumference side of a fluid pressure cylinder of the movable pulley,
wherein the cylinder portion and the movable pulley are fixedly connected to each other,
wherein the tone wheel has an attachment portion sandwiched and supported between the movable pulley and the fluid pressure cylinder,
wherein the cylinder portion continues from the attachment portion through a bending portion, and
wherein the attachment portion is pressed against a back surface of the movable pulley in the moving direction of the movable pulley by a fluid pressure in the fluid pressure cylinder.

8. The belt-drive continuously variable transmission as claimed in claim 7, wherein one of the detection portions is formed by any one of a hole, an open-end detection portion whose one end is cut off, a concave detection portion, and a convex detection portion.

9. The belt-drive continuously variable transmission as claimed in claim 7, wherein the sensor is at a side cover that covers an axial direction end surface of the one of the pair of pulleys.

10. The belt-drive continuously variable transmission as claimed in claim 7, wherein an outside diameter of the cylinder portion is smaller than an outside diameter of the movable pulley.

11. The belt-drive continuously variable transmission as claimed in claim 7, wherein the tone wheel is on a movable pulley side.

12. The belt-drive continuously variable transmission as claimed in claim 7, wherein a length, in the moving direction of the movable pulley, of one of the detection portions is longer than a movable range of the movable pulley.

13. A belt-drive continuously variable transmission comprising:
a pair of pulleys, each of the pair of pulleys having:
  (a) a stationary pulley; and
  (b) a movable pulley that moves toward or away from the stationary pulley in an axial direction of the pulley;
a belt wound around the pair of pulleys; and
a rotation state detecting device for detecting rotation of one of the pair of pulleys, the rotation state detecting device having:
  (c) a tone wheel that rotates integrally with the one of the pair of pulleys; and
  (d) a sensor that faces the tone wheel, the tone wheel having a cylinder portion that extends along a moving direction of the movable pulley and the cylinder portion having a plurality of detection portions at regular intervals along a circumferential direction throughout an entire circumference of the cylinder portion and extending along the moving direction,
wherein the cylinder portion is on an outer circumference side of a fluid pressure cylinder of the movable pulley,
wherein the cylinder portion and the movable pulley are fixedly connected to each other,
wherein the tone wheel has an attachment portion that abuts the movable pulley and abuts the fluid pressure cylinder in the axial direction of the pulley such that the attachment portion and the movable pulley are axially fixed relative to each other, and
wherein the cylinder portion continues from the attachment portion through a bending portion such that the cylinder portion, the attachment portion and the bending portion form an integral part made from a same material.

14. The belt-drive continuously variable transmission as claimed in claim 13, wherein one of the detection portions is formed by any one of a hole, an open-end detection portion whose one end is cut off, a concave detection portion, and a convex detection portion.

15. The belt-drive continuously variable transmission as claimed in claim 13, wherein the sensor is at a side cover that covers an axial direction end surface of the one of the pair of pulleys.

16. The belt-drive continuously variable transmission as claimed in claim 13, wherein an outside diameter of the cylinder portion is smaller than an outside diameter of the movable pulley.

17. The belt-drive continuously variable transmission as claimed in claim 13, wherein the tone wheel is on a movable pulley side.

18. The belt-drive continuously variable transmission as claimed in claim 13, wherein a length, in the moving direction of the movable pulley, of one of the detection portions is longer than a movable range of the movable pulley.

* * * * *